United States Patent

Sullivan

Patent Number: 5,850,329

Date of Patent: *Dec. 15, 1998

[54] MAGNETIC RECORDING DEVICE COMPONENTS

[76] Inventor: Thomas Milton Sullivan, 3250 N. Graham Rd., Franklin, Ind. 46131

[*] Notice: The term of this patent shall not extend beyond the expiration date of Pat. No. 5,623,386.

[21] Appl. No.: 624,824

[22] Filed: Mar. 27, 1996

Related U.S. Application Data

[63] Continuation-in-part of Ser. No. 332,419, Oct. 31, 1994, Pat. No. 5,623,386.

[51] Int. Cl.⁶ ........................................... G11B 5/82
[52] U.S. Cl. .......................................... 360/135
[58] Field of Search ............................ 360/135, 131; 428/694 NF, 64.6, 328, 329; 427/130, 131, 128

[56] References Cited

U.S. PATENT DOCUMENTS

| | | |
|---|---|---|
| 3,681,225 | 8/1972 | Genma et al. . |
| 3,704,211 | 11/1972 | Phillips . |
| 4,069,360 | 1/1978 | Yanagisawa et al. ...................... 428/64 |
| 4,239,819 | 12/1980 | Holzl .................................. 427/255.2 |
| 4,376,963 | 3/1983 | Knoop et al. ........................... 360/135 |
| 4,598,017 | 7/1986 | Bayer et al. ............................ 428/336 |
| 4,637,963 | 1/1987 | Nishimatsu et al. .................... 428/694 |
| 4,961,913 | 10/1990 | Sullivan . |
| 5,356,522 | 10/1994 | Lal et al. ........................... 204/192.15 |
| 5,374,412 | 12/1994 | Pickering et al. ...................... 428/336 |
| 5,465,184 | 11/1995 | Pickering et al. ................... 360/97.01 |
| 5,623,386 | 4/1997 | Sullivan ................................ 360/135 |

FOREIGN PATENT DOCUMENTS 57-56309  4/1982  Japan .

*Primary Examiner*—Allen Cao
*Attorney, Agent, or Firm*—Dickinson Wright PLLC

[57] ABSTRACT

A magnetic memory recording component comprising at least a silicon carbide ceramic outer surface. If the silicon carbide ceramic outer surface has a depression in the surface thereof, the maximum depression of the maximum dimension as measured in any direction, e.g. width, depth, length or the like of the depression is less than 0.0001".

13 Claims, 2 Drawing Sheets

MAGNETIC RECORDING DEVICE COMPONENTS

This is a continuation-in-part of Ser. No. 08/332,419, filed Oct. 31, 1994, U.S. Pat. No. 5,623,386.

FIELD OF THE INVENTION

This invention relates to components for magnetic recording or "hard disk drive" devices.

BACKGROUND ART

Hard disk drives consist of a disk or multiplicity of disks separated by spacers which are rotated at high speeds on a spindle by a small electric motor inside an aluminum case. A small head at the extremity of a supporting arm glides above the surface of the disks on an aerodynamic film of air at clearances below 3 millionths of an inch. The head selectively magnetizes minute spots on the rotating disk to create a binary code representing data to be stored or retrieved by the head. The magazine article "Disk-Storage Technology", by White published in the August 1980 issue of *Scientific American* is included in this application by reference.

Though many materials have been tried, rotating disks are usually composed of an aluminum core, electroless plated with about 0.0005 inch thick nickel metal to harden the surface, which is polished, and covered with a thin magnetic medium layer. Aluminum disks typically measure 2.550 inches OD, 0.7884 inch ID, and 0.025 to 0.035 inch thick. Larger disks have greater thickness to maintain surface planarity while smaller diameter disks can be made thinner. The magnetic medium layer is the part that is magnetized to store or retrieve data while the nickel coated aluminum disk or substrate provides the mechanical strength and rigidity to support the magnetic medium under high centripetal loads without "crashing" into the head in relative motion over its surface.

Almost all media is presently applied by sputtering. Higher areal densities result from reducing magnetic layer thickness as well as changing magnetic properties. U.S. Pat. No. 3,704,211 shows that areal density depends on the layer thickness and coercive force. Reducing layer thickness and increasing the packing density of magnetizable zones and by increasing the coercive force allows increased packing density and therefore, are desirable objectives. This is achieved by applying extremely thin but uniform magnetic layers by sputtering metals of the eighth subgroup of the Periodic Table of Elements in a high vacuum onto a disk substrate. Because aluminum coated with nickel is electrically conductive, it can be easily biased with voltage. This attracts plasma ions causing bombardment of the growing magnetic media layer and improving its magnetic properties. Disk substrates which are not electrically conductive and thus, cannot be biased, like glass, require a more complex deposition process and higher process temperatures to achieve acceptable magnetic recording properties. Magnetic recording media deposited by sputtering tend to be thinner, more uniform, and higher in coercive force than those resulting from other processes.

A problem with the prior art is that the requirement of higher coercivity is leading to higher process temperatures which can render disks useless when the nickel phosphorus becomes magnetic at about 300° C.

Providing substrates which can be made thinner to reduce energy consumption, flatter and stiffer to reduce head glide height, and more easily finished to remove surface defects to eliminate "dead spots" in the magnetic recording medium is a considerable problem in connection with manufacturing hard disk drives.

Magnetic recording disk substrates are usually made from aluminum metal because of high specific stiffness as a metal, it is not ferromagnetic, and it is economical. The electroless nickel exterior can be finished with readily available tools and processes, and it is electrically conductive. As a material for magnetic recording disks, however, aluminum has reached a stage of development at which it can no longer be made significantly thinner without sacrificing rigidity and cannot be finished to higher standards of surface planarity. Highly polished aluminum substrates are also easily scratched. Scratches frequently appear during polishing which are very difficult to remove. Small recesses in the substrate surface, caused by plating defects and referred to as "nickel pits", result in data errors because the sputtered magnetic media coating in those areas is too far removed from the head. Alternatively, intensive lapping and polishing can reduce surface planarity. Poor surface planarity and surface defects in turn, can cause the head to "crash" into the hard disk rather than glide over the surface.

Heads are usually located on a gimbal located on the end of an actuator arm which is connected to a servo affixed to the case. A servo moves the head across the diameter of a spinning disk to locate data. Signal amplitudes from the magnetic memory coating have been decreasing as bit and track densities are steadily increasing. Head glide height is diminishing to compensate for lower signal strength. Though most heads glide above the surface of the magnetic memory coating, some heads contact the surface of the disk. Heads can abrade the disk during take off and landing as the aerodynamic film of air needed to support the head is either developed or reduced. Some heads are designed to remain fully or partially in contact with the disk. Contact between the head and disk, whether deliberate or accidental, can damage both disk and head. The magazine article titled "HP uses dual-stripe MR heads in latest disk drives" on page 14 in the January/February 1995 issue of *Data Storage* is incorporated in this application by reference. The article titled "Sliding contact recording for hard disks" by Foster on page 23 of the same magazine is also incorporated in this application by reference. Another article titled "Single-wafer processing meets advanced thin-film head requirements" by Ballentine published in the January/February 1995 issue of *Data Storage* is incorporated in this application by reference as well.

In order to minimize head damage, heads have been made on ceramic "sliders". Though a variety of materials have been used for both read/write heads and burnishing heads, $Al_2O_3$—TiC predominates. $Al_2O_3$—TiC is difficult to polish to the standards of head making because of grain pullout, occasional surface recesses, and variable hardness zones within a particular sample. Silicon carbide made by consolidating powders at high temperature under pressure has also been used to make heads. Silicon carbide made by powder metallurgical methods has large pores which may be exposed on the surfaces of polished samples. Pores may result in discontinuities in circuits deposited on the surfaces by sputtering. Second phase additives used to facilitate consolidation of silicon carbide powders may cause roughness around grain boundaries and cause sputtered coatings to deposit at uneven rates on the surface of the head substrate. Roughness alters the aerodynamic profile of a head and renders the head more easily fractured, since failures tend initiate at points of less than perfect homogeneity.

Asperities on the surfaces of disks sputtered with magnetic media are removed with burnishing heads. Commonly made from $Al_2O_3$—TiC and more recently sintered SiC ceramic materials made by consolidating finely divided particles under pressure at high temperature, burnishing heads are shaped like read/write heads so that they will pass over the sputtered disks at a low enough glide height to shear asperities from the disk that might cause read/write heads to crash. Again, surface roughness of the burnishing head can cause aerodynamic instability, mechanical failure, and processing difficulty.

Heads used for storing or retrieving data, burnishing, or clocking sometimes have features such as grooves or protrusions like runners, legs, or feet which are machined, milled, etched, or molded into the surface that will be adjacent to the disk surface to control head glide. Pores within a material such as reactively bonded silicon carbide coated with non-porous silicon carbide can be exposed during the course of processing to render the head unusable due to aeromechanical drag.

Actuators arms position heads over the desired track on a disk. The magazine article titled "Why rotary actuators behave the way they do" by Williams and Balasingam published on page 43 of the November/December 1995 issue of *Data Storage* magazine is incorporated in this application by reference. The specific stiffness of actuators arms limits response time. Reducing size not only reduces head merge problems, but reduces turbulence on the disk surface.

Hard disk drive magnetic memory recording devices usually contain two or more hard disks coated with magnetic media on both sides of each disk. Disks are separated by a spacer ring near the internal diameter of the disk. Spacer surfaces in contact with disks must be even more parallel than the recording surfaces of the disks to prevent warpage from clamping and subsequent crashing of heads into recording media of disk substrate surfaces as disks rotate. Spacer materials should also have a coefficient of thermal expansion equivalent to disk substrates to avoid thermal stresses, and, like disk substrates, must not be ferromagnetic so magnetic fields in the recording media are not perturbed. Hard disk drives using aluminum disks typically use aluminum spacers with surfaces parallel to <0.000050 inch. Aluminum is so soft and ductile that finishing surfaces to the required standards can only be accomplished at substantial cost. The need for parallelism is further complicated by potentially uneven torque on metal bolts and screws used to hold assemblies of disks and spacers together. Small bolts and screws are notoriously difficult to mechanically turn to uniform torque, in part because all bolts and screws are slightly different with respect to thread pitch and head location. Non-uniform torque warps substrates and spacers.

Disk substrates rotate on a non-ferromagnetic metal shaft transmitting motive torque from a minute electric motor to spin disks and spacers. Like spacers, shafts or spindles used in connection with aluminum disk substrates and motors are usually made from aluminum to eliminate stresses and distortions due to CTE mismatch as well as ferromagnetic fields other than those in the magnetic recording medium.

The entire hard disk drive is encased in a two-piece aluminum shell forming a frame to support and protect disk drive components. Since maintaining uniform CTE and non-ferromagnetic behavior throughout the structural components of the hard disk drive is important, cases are made from aluminum like the spindle, spacers and disks. Unfortunately, aluminum develops an aluminum oxide exterior surface or patina when exposed to air. Aluminum oxide from the surfaces of exposed aluminum parts can be drawn onto the magnetic media coated surfaces of the rotating disks like large meteors striking the otherwise serene surfaces on planets. Heads gliding just above the disk surface or in contact with the disk surface can crash into the relatively large debris. Cases are usually coated with an epoxy surface to reduce spalling, but epoxy can itself spall or emit byproducts in the course of curing that later causes head crashes.

Prior art describes a number of technologies for hard disk drives. U.S. Pat. No. 3,681,225, U.S. Pat No. 4 069,360, U.S. Pat. No. 4,239,819, U.S. Pat. No. 4,376,963, U.S. Pat. No. 4,598,017, and U.S. Pat. No. 4,637,963 are known to the Applicant and incorporated by reference.

U.S. Pat. No. 3,681,225 describes a magnetic disk where a magnetic layer is made by electro-deposition on a synthetic resinous core.

U.S. Pat. No. 4,069,360 describes a magnetic recording element having a disk made of an alloy with a polished layer of non-ferromagnetic alloy being provided which covers the surface of the alloy disk. A thin film constituting a ferromagnetic recording medium covers the outer layer. An amorphous inorganic oxide layer in turn covers the magnetic recording medium.

U.S. Pat. No. 4,376,963 describes a composite structure for magnetic recording. The structure has a core of polymeric material with at least one silicon disk. The outer surface of the silicon disk is excellent with respect to flatness and smoothness, but the disadvantage of this disk is that silicon metal reacts with other metals contained in the magnetic recording medium to form eutectic compositions lacking the needed anisotropy unless the sputtered layer is deposited on a relatively cold disk substrate, in which case the recording medium will have reduced coercive force resulting in poor areal density.

U.S. Pat No. 4,598,017 describes a substrate made by bonding porous silicon carbide ceramic infiltrated with silicon metal (SiSic) for increased density to a polymeric frame. The SiC has sufficient modulus of elasticity, hardness, and non-ductility to be finished to high standards of surface finish and planarity. However, silicon carbide made by reaction bonding or reaction sintering that has been infiltrated with silicon metal, has variable levels of surface electrical resistivity. Coating a SiSiC substrate by bias sputtering the magnetic layer over spots in the substrate that vary in resistivity may produce discontinuities in the magnetic properties of the recording layer. The result is "dead spots" on the disk that are costly to detect and prevent. Lapping and polishing a SiSiC disk with a surface having hard non-ductile SiC regions alternating with soft relatively ductile Si metal is more difficult and costly than with a disk with uniform hardness and ductility.

U.S. Pat. No. 4,637,963 describes a substrate made from polymers. Polymers are non-conductive as a rule with respect to bias sputtering and too ductile to easily finish to high standards of planarity and surface finish. Glass or metal oxide ceramic substrates are subject to precipitations around grain boundaries. Surface defects on glass/ceramic substrates associated with grain pullout are surrounded with precipitations of salts that act like metallurgical fluxes to metal coatings created during sputtering. Sputtered magnetic media coatings lose anisotropy needed to record data as a binary code when precipitated fluxes fluidize depositing metals. Large dead spots result from surface flaws, even sub-micron sized grain boundaries. Elimination of pits larger than 0.05 microns by means of process control is very difficult in high volume production. Glass or glass/ceramic has the hardness and non-ductility needed for polishing but suffers from low temperature softening due to phase changes caused by instantaneous thermal gradients during lapping and polishing. Lack of electrical conductivity makes bias sputtering of coatings onto glass or glass/ceramic essentially impossible. Only after the initial coating is "grown" across the surface of the substrate can substrate bias be maintained.

Ceramic materials have many advantages as substrate materials that were recognized early in the development of hard drives. Compared to metals or polymers, ceramic materials are non-ductile and very hard. Required surface planarity and finish are more easily achieved with rigid, non-ductile substrate materials that are abraded during lapping and polishing rather than with non-rigid, ductile substrate materials that conform to abrasive surfaces without abrading. Ceramic materials, however, have not succeeded in the past because process technology was unable to approach the cost per part required for production volumes reaching the tens of millions of units per year.

Powder sintering like hot isostatic pressing is slow, expensive, and results in materials with large surface pores compared to magnetic memory coating thickness and flying dimensions. Reactive Sintered Silicon Carbide (RSSiC) is made by consolidating finely divided silicon metal powder and carbon under thousands, if not tens of thousands, of pounds per square inch of pressure, followed by heating the compress until silicon metal reacts with carbon to form silicon carbide. The resulting silicon carbide ceramic part is crudely shaped and prone to warping when approaching the thickness of disk substrates. Plates are made over 0.125 inch thick and must be diamond ground to form 0.035 inch thick substrate blanks before lapping and polishing. RSSiC has, by virtue of the forming process, multitudes of pores measuring up to 0.003 inch across, substantially larger than the 0.0001 inch maximum surface pore size acceptable in small numbers for substrates. Pore size can only be reduced by high temperature consolidation under pressure, such as by glass encapsulation hot isostatic pressing (HIP). HIP processing is very capital intensive and is unable to meet the unit volume and cost requirements for disk substrates.

U.S. Pat. No. 4,239,819 describes a Chemical Vapor Deposition (CVD) method for making silicon carbide in which silicon halide or silicon hydride gases are reacted with alkanes at elevated temperatures to deposit ceramic product on a heated surface. Deposition rates for material with small pores are slow, usually around 0.001 to 0.004 inch thickness per hour. Yields are usually less than 5% of reactants. Only crude shapes are possible. Finishing parts to substrate standards requires extensive diamond finishing. It is possible to make substrates by this disclosed CVD method, but the cost is more than ten times greater than for aluminum substrates.

Infiltrating RSSiC by CVD to densify a porous monolith is a slow process. Deposition rates must be slow in order to prevent closure of interconnected pores before they are completely filled with silicon carbide. Process temperature is lowered to avoid warping the substrate. Deposition rates ranging from 0.0001 to 0.0006 inch per hour are typical for infiltrating a porous substrate. Infiltrating RSSiC monoliths typically requires several days of processing time to eliminate pores that would be unacceptable for magnetic media substrates.

Though usually made from highly polished electroless nickel plated aluminum metal, disk substrates have been made from glass compositions, carbon, ceramics, polymers, and composites. Extensive experiments with the use of ceramic and plastic compositions for substrates have been conducted. In particular, substrates made from powder metallurgy and chemical vapor deposition methods have been tried.

Powder metallurgy is an unsuitable process technology for making silicon carbide substrates because pore size of parts made by versions of the process capable of meeting hard drive production volume requirements is too large for magnetic coating. Chemical Vapor Deposition or infiltration is an unsuitable process technology for making silicon carbide substrates because silicon carbide must be deposited so slowly to make standard disk substrates without warpage and unacceptable pore size, that it is not economically competitive with existing aluminum substrate technology.

SUMMARY OF THE INVENTION

It is the first object of the invention to reduce cost per megabyte of memory, increase storage capacity, improve reliability and reduce energy consumption per megabyte of storage capacity due to higher areal density and reduced weight for magnetic storage devices by utilizing new and improved components.

It is a further object of the present invention to utilize ceramic materials for magnetic memory storage components which are more easily finished to meet the storage device surface planarity and finish requirements.

The present invention also provides a more efficient utilization and conservation of energy resources by using ceramic materials as components of a magnetic memory storage or recording device, these components reduce energy consumption per megabyte of storage capacity due to higher areal density and reduced weight.

Other objects and advantages of the present invention will become apparent as a description thereof proceeds.

In satisfaction of the foregoing objects and advantages, the present invention is directed to a magnetic memory recording device and components thereof which are principally made of ceramic materials. In its broadest embodiment, the invention comprises the recording device components singularly or in combination so as to form a part or parts of the magnetic memory recording device.

The magnetic memory recording components of the present invention comprise at least one or more of the following: a substrate used to support a magnetic memory storage medium coating or as a substrate for a head, the substrate having a silicon carbide ceramic outer surface with few exposed pores, scratches, or other such depressions in the surface of the substrate having at least one dimension larger than ~0.0001 inch, and having little non-stoichiometric silicon or carbon other than that which may be residual from the process of making silicon carbide ceramic material; spacers separating adjacent substrates which spacers are made from silicon carbide ceramic, silicon nitride ceramic, silicon metal coated with a thin film of silicon carbide up to ~0.010 inch thick, carbon or graphite, wherein the silicon carbide or silicon nitride materials may have up to ~30% porosity by weight; a shaft utilized to provide a rotational axis for disk substrates and spacers, the shaft made from silicon carbide ceramic, silicon nitride ceramic, or silicon metal which may be coated with a silicon carbide thin film not exceeding ~0.010 inch thickness; a casing enclosing working parts of the magnetic memory recording device, the casing made from silicon carbide ceramic, silicon nitride ceramic, or silicon metal which may be coated with a thin film of silicon carbide ceramic less than ~0.010 inch thick wherein the silicon carbide or silicon nitride materials may have up to 30% porosity by weight;

self-holding machine taper pins for attaching components of the magnetic memory recording device, said pins pressed into sockets wherein the angle of the pins is between 0.5 and 7 degrees and the pins are made from silicon carbide, silicon nitride, or silicon metal; and actuators arms made from silicon carbide or silicon nitride without pores in the surface large than 0.0001 inch, as described previously for substrates.

DESCRIPTION OF THE PREFERRED EMBODIMENTS

Figure 1:
FIG. 1 shows a photomicrograph of a substrate surface material at 2000× magnification. The photomicrograph depicts the relatively non-porous silicon carbide ceramic surface of a substrate for a magnetic memory storage and retrieval device made in accordance with the teachings of the present invention.

Each embodiment of the present invention provides a magnetic memory recording device, head, hard disk drive or other component using substrates having a relatively non-porous silicon carbide ceramic surface with few exposed pores, scratches or other defects measuring more than 0.0001 inch across the largest planar dimension as shown in FIG. 1. The non-porous silicon carbide ceramic surface covers an area of the substrate intended for use with the component. Thus, the usable surface of the component may not be its entire surface so there could be areas of porous surface, defect-containing surface or even through holes in the component. Spacers made from porous silicon carbide ceramic, porous silicon nitride, carbon or graphite coated with a thin film of silicon carbide or silicon nitride are provided for separating silicon carbide, glass, or aluminum disks. Disks and spacers rotate on a silicon carbide ceramic, silicon nitride ceramic, or silicon metal shaft. Silicon carbide ceramic, silicon nitride ceramic, or silicon metal with a silicon carbide or silicon nitride ceramic surface is used to make a casing for the hard disk drive. Components within the case are affixed with machine taper pins pressed into place. The machine taper pins are made from silicon carbide, silicon nitride, or silicon metal. Actuators are made from material comparable to the materials used herein for substrates.

Substrate surfaces are lapped and polished to <50 microinch peak-to-valley surface planarity from OD to OD and <0.25 microinch Ra surface roughness. Before being coated with a magnetic memory storage medium coating, the disk substrate may be "textured" to <350 microinch peak-to-valley surface planarity. Disk substrates may be up to 12 inches in diameter and measure 0.004 to 0.035 inch thick to be compatible with magnetic storage and retrieval devices, or they may be made thinner than aluminum to take advantage of the high specific modulus of elasticity of SiC compared to aluminum. For example, a standard "65 mm" disk made from aluminum is 0.035 inch thick. The same diameter disk made from silicon carbide can be as little as 0.012 inch thick. Reducing rotating mass reduces energy consumption proportionally.

Figure 2:
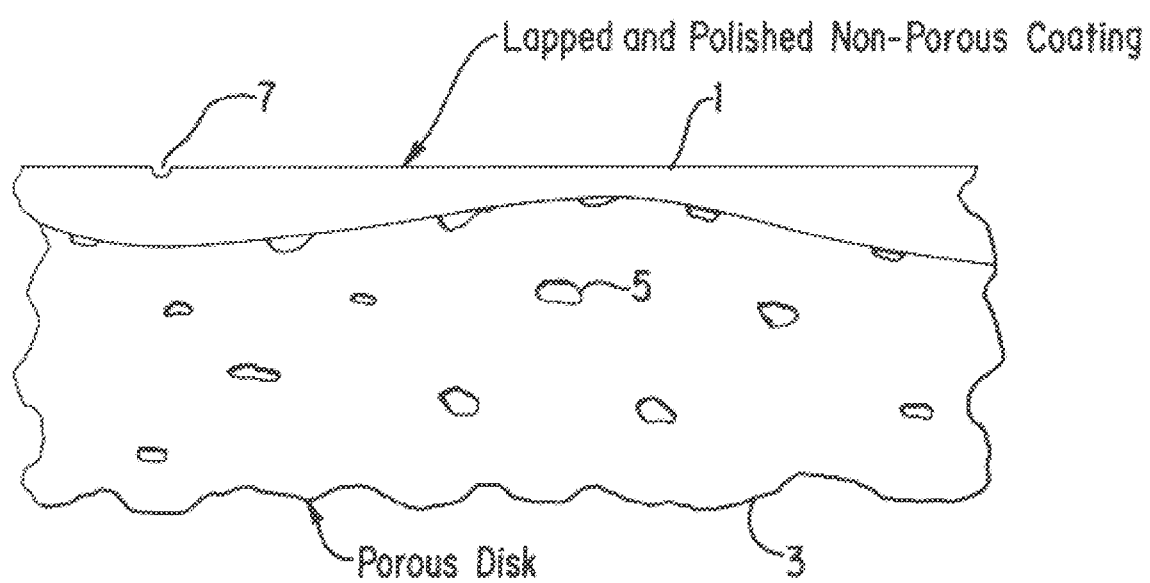
FIG. 2 shows a cross-sectional view through a polished substrate made in accordance with some of the embodiments of the present invention.

One embodiment of the present invention provides the aforesaid, relatively non-porous, silicon carbide ceramic surface 1 on a comparatively porous silicon carbide ceramic monolith 3 having pores 5 larger than the <0.0001 inch pores 7 which may be tolerated on the surface of the substrate as in FIG. 2. Another embodiment provides a ceramic substrate with few pores, either internally or externally exposed, larger than 0.0001 inch. In yet another embodiment the non-porous silicon carbide surface 1 can occupy only a portion of the entire substrate surface, for example, substrates having intentional openings or areas of porosity or defect which can be avoided by programming a head or the like to avoid these areas or be inoperative in these areas. The non-porous surface of FIG. 2 has utility in head applications, disk substrates or any other components disclosed herein.

A further embodiment of the present invention provides a relatively non-porous silicon carbide ceramic surface on a pyrolytic carbon, graphite, or carbon-carbon composite disk. The pyrolitic carbon, graphite, or carbon-carbon composite may have pores larger than 0.0001 inch.

Substrate materials used for disks can also be used as substrates for burnishing heads or data retrieval/storage heads. Minimizing exposed pores is important to prevent collection of metal from the disk surface, to enable low head glide height, and to prevent discontinuities in circuits printed on the surface.

None of the preferred embodiments of the present invention utilize silicon metal to fill surface pores or to densify a porous ceramic monolith. Very small amounts of non-stoichiometric silicon metal or carbon are, however, common byproducts or coproducts of the making of silicon carbide ceramic by powder metallurgical, chemical vapor deposition, or supercritical fluid processing methods. U.S. Pat. No. 4,239,819, U.S. Pat No. 4,961,913, and U.S. patent application Pend. No. 08/332,419 are incorporated into this application by reference.

Spacers made from silicon carbide, silicon nitride, or carbon or graphite have equivalent Coefficient of Thermal Expansion (CTE) and therefore expand at the same rate as silicon carbide disk substrates. Porosity is not an issue because spacers are not coated with magnetic memory coatings. Silicon carbide, silicon nitride, silicon carbide coated carbon or graphite, or carbon or graphite alone are relatively non-ductile and therefore can be easily polished to the required surface planarity and do not deform under load, yet have the rigidity needed to precisely maintain the relative position of the rotating disks. It is possible to polish these materials to more than an order of magnitude better parallelism and surface planarity than standard aluminum.

Silicon carbide, silicon nitride, or silicon metal shafts or spindles have significant advantages over other materials in connection with silicon carbide disk substrates and spacers. Silicon carbide, silicon nitride, and silicon metal have adequate strength and modulus of elasticity, are not ferromagnetic, and have equivalent CTE. Equivalent CTE is important for hard disk drives using silicon carbide disk substrates to prevent loosening the rotating assembly as the hard drive warms. Silicon carbide with up to 30% porosity by weight has sufficient strength and stiffness to be used for shafts and spindles.

Cases made from silicon carbide, silicon nitride, or silicon with a silicon carbide surface expand at nearly the same rate as other silicon carbide or silicon or carbon/graphite components of a hard disk drive, and thus, will hold the contents of the case in place during periods of thermal stress. In addition, silicon carbide, silicon nitride, or silicon carbide coated silicon metal do not shed a surface patina or layer that might cause clearance problems between heads and magnetic memory coated disk substrates. This feature eliminates the need for epoxy coatings generally used to "passivate" the surface of cases made from aluminum. Porosity of the case is not an issue as long as no interconnected pores exist that might enable ingress of environmental contaminants.

Machine taper pins such as Morse Taper, Brown & Sharpe Taper, Jarno Taper, American National Standard Taper, British Standard Taper and other similar tapers all have in common a "self-holding" feature, such that a machine taper pin pressed into a hole is so firmly seated that there is no considerable frictional resistance to any force tending to turn, rotate, or extract the tapered pin. *Machinery's Handbook* 23rd *Edition* by Oberg et al published by Industrial Press, Inc., New York pages 897 to 916 are included in this application by reference. Unlike screws or bolts, pins tend to align parts. Pressing pins into place to affix disk drive assemblies has the distinct manufacturing advantage of allowing the use of a simple, reliable pressure transducer to accurately determine when enough pressure has been applied to hold parts in place without warpage. Automatic assembly is made simpler, more reliable, and faster.

Actuators arms need to have high specific stiffness to rapidly respond to servos without unnecessary head motion or "overshoot". Because they fit between disks and operate in a turbulent air flow regime, actuators need to be small and stiff. Actuators made from silicon carbide or silicon nitride have many times greater specific stiffness than metals presently in use. Servo response time is reduced. Aforesaid material used for substrates is used for actuators.

Figure 3:
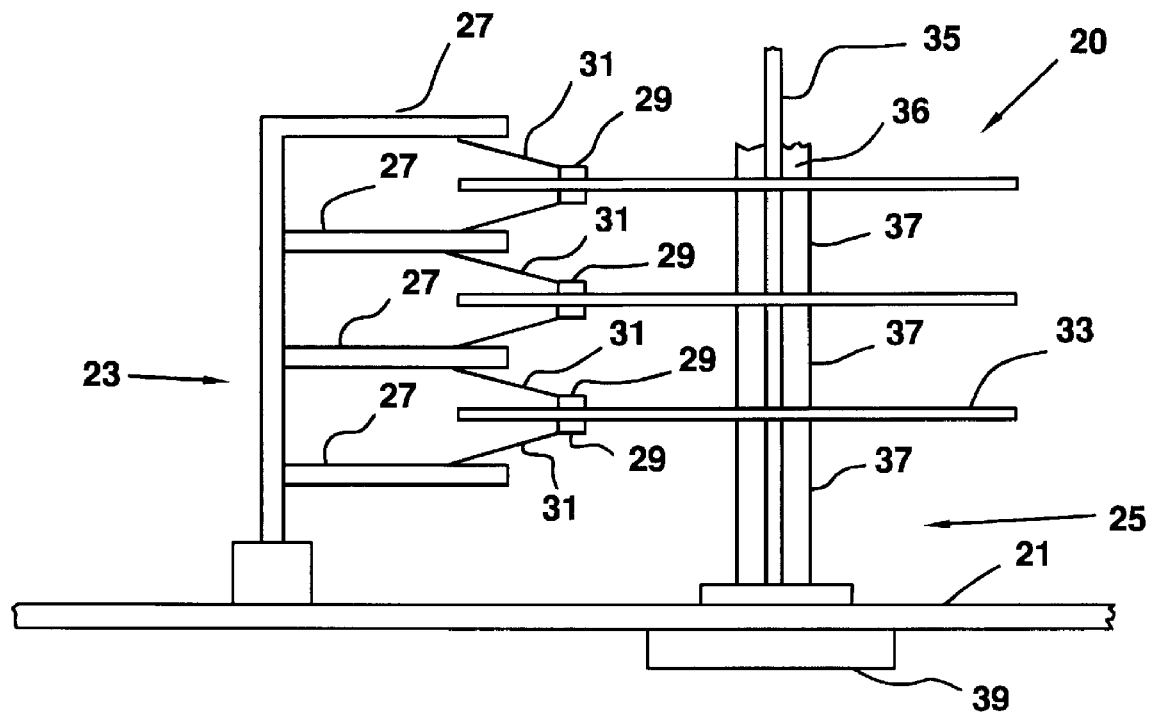
FIG. 3 is a partial schematic view of a disk drive showing components made of the material of the invention.

FIG. 3 depicts a schematic of a disk drive designated by the reference numeral 20 and including a casing 21 supporting an actuator assembly 23 and a drive assembly 25.

The actuator assembly 23 includes actuator arms 27 supporting heads 29 via flexures 31. One or more of the heads 29 can be a read/write head, a burnishing head or a clock head. The drive assembly 25 includes disks 33 supported by a shaft 35 and spacers 37, the assembly 25 held together by a fastening means represented by 36. The drive assembly also includes an electric motor to drive the disk 33, the motor represented by 39.

The actuator arms 27 and heads 29 can be made of silicon carbide having a silicon carbide outer surface, a depression in the outer surface of the head or actuator arm having a maximum dimension of 0.0001 inch, the actuator arm or head having no non-stoichiometric silicon and no carbon other than that which is residual from a process of making silicon carbide ceramic material.

I claim:

1. A magnetic memory recording component comprising:
   i) a component made of silicon carbide and having an exposed silicon carbide outer surface, a depression in the exposed outer surface of the component having a maximum dimension of 0.0001 inch, and
   ii) the component having no non-stoichiometric silicon and no carbon other than that which is a residual from a process of making silicon carbide ceramic material.

2. The component of claim 1 wherein the outer surface is polished to less than 10 Angstrom Ra surface roughness.

3. The component of claim 1 wherein the component is entirely ceramic and has a thickness between 0.004 inches and 0.035 inches.

4. The component of claim 1 wherein the component further comprises an exposed silicon carbide outer layer, the outer surface covering a porous silicon carbide monolith.

5. The component of claim 1 wherein the exposed silicon carbide outer surface comprises only a portion of the entire surface of the component.

6. An actuator arm for locating a head relative to tracks on a disk, the actuator arm made of silicon carbide and having an exposed silicon carbide outer surface, a depression in the exposed outer surface of the actuator arm having a maximum dimension of 0.0001 inch, the actuator arm having no non-stoichiometric silicon and no carbon other than that which is residual from a process of making silicon carbide ceramic material.

7. The actuator arm of claim 6 wherein the disk is made of silicon carbide and has a silicon carbide outer surface, a depression in the outer surface of the disk having a maximum dimension of 0.0001 inch, the disk having no non-stoichiometric silicon and no carbon other than that which is residual from a process of making silicon carbide ceramic material.

8. A magnetic memory coating burnishing head made of silicon carbide and having an exposed silicon carbide outer surface, a depression in the exposed outer surface of the burnishing head having a maximum dimension of 0.0001 inch, the burnishing head having no non-stoichiometric silicon and no carbon other than that which is residual from a process of making silicon carbide ceramic material.

9. The burnishing head of claim 8 wherein at least one of runners, rails, legs, feet and other protrusions are machined, milled, etched, or molded into a surface of a portion of the burnishing head adjacent to a magnetic memory coating on a disk.

10. A read/write head made of silicon carbide and having an exposed silicon carbide outer surface, a depression in the exposed outer surface of the read/write head having a maximum dimension of 0.0001 inch, the read/write head having no non-stoichiometric silicon and no carbon other than that which is residual from a process of making silicon carbide ceramic material.

11. The read/write head of claim 10 wherein at least one of runners, rails, legs, feet and other protrusions are machined, milled, etched, or molded into a surface of a portion of the read/write head adjacent to a magnetic memory coating on a disk.

12. In a magnetic memory recording device having a component for use with a magnetic memory component medium, the improvement comprising said component being made of silicon carbide and having an exposed silicon carbide outer surface wherein a depression on the outer surface has a maximum size of 0.0001 inch and said component has no non-stoichiometric silicon and no carbon other than residual levels resulting from a manufacture silicon carbide ceramic material.

13. A magnetic clock head made of silicon carbide and having an exposed silicon carbide outer surface, a depression in the exposed outer surface of the clock head having a maximum dimension of 0.0001 inch, the clock head having no non-stoichiometric silicon and no carbon other than that which is residual from a process of making silicon carbide ceramic material.

* * * * *